Dec. 27, 1949   J. C. HAEFELI   2,492,219
CHAIN TENSIONER
Filed April 5, 1945

Julius Charles Haefeli,
Inventor.
by Lester L. Sargent

Patented Dec. 27, 1949

2,492,219

UNITED STATES PATENT OFFICE 2,492,219

CHAIN TENSIONER

Julius Charles Haefeli, Birmingham, England, assignor to The Austin Motor Company Limited, Birmingham, England Application April 5, 1945, Serial No. 586,719
In Great Britain April 13, 1944

6 Claims. (Cl. 74—243)

The invention relates more especially to roller chain drive used in the timing gear of internal combustion engines more particularly when the latter are used for driving motor vehicles; but may be used in other cases of roller chain drive.

Chain tensioning means according to this invention comprise one or more rings of rubber or rubberlike or other resilient material which are fitted on one or each of the chain wheels, and bear radially outwardly against the chain links without bearing against the rollers and automatically keep the chain in proper tension.

According to a convenient form of the invention each chain wheel has one or more rows of teeth, the chain being of an appropriate form, and a rubber or like resilient ring or rings is or are placed on one or each side of a row of teeth and/or between rows of teeth of one or each of the chain wheels.

Convenient embodiments of the invention are described with reference to the accompanying drawings, of which:

Figure 1:
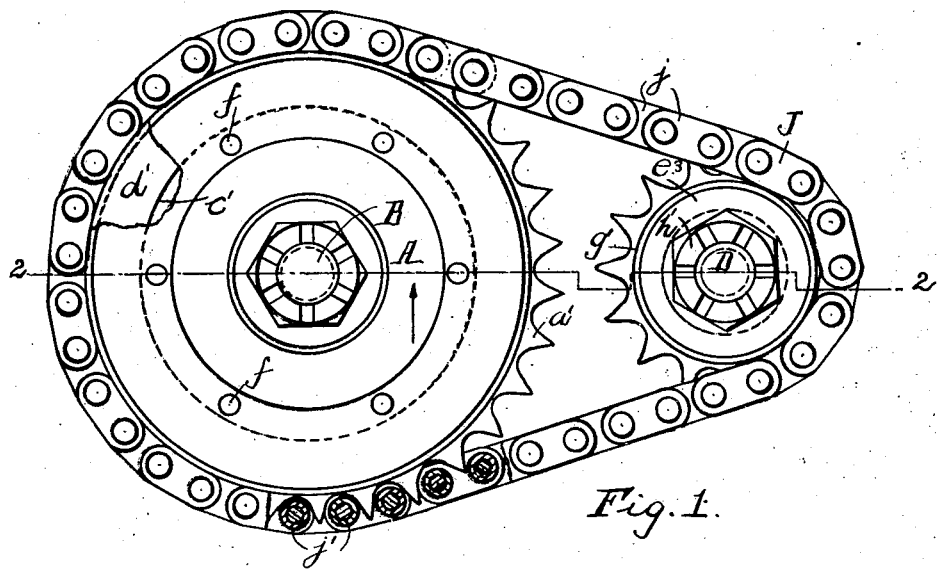
Figure 1 is a side elevation, partly in section, showing two chain wheels connected by a chain, the wheels being fitted with resilient rings according to the invention.
Figure 2:
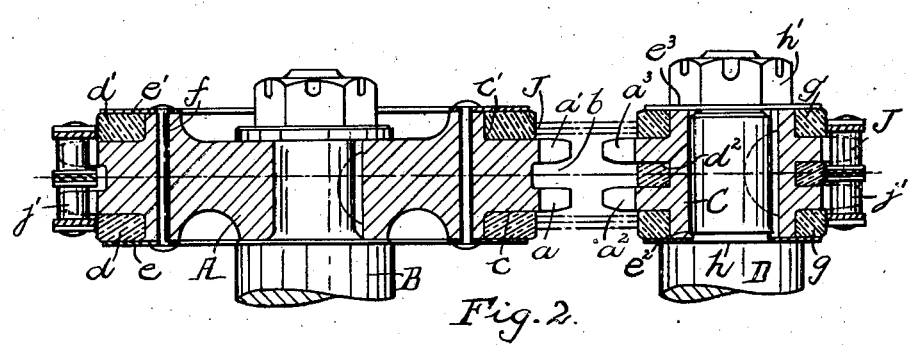
Figure 2 is a section taken on the irregular line 2, 2, of Figure 1, and looking in the direction of the arrow of that figure.

Referring first to Figures 1 and 2, A indicates the larger of the chain wheels. It is keyed on a shaft B and has two rows of teeth $a$, $a'$, leaving a space $b$ between them. At the outer sides of the teeth deep rabbets $c$, $c'$ are formed in which are laid rings $d$, $d'$ of synthetic rubber, this latter being found much more durable than natural rubber. The rings are kept in place by annular plates $e$, $e'$, these being retained by long rivets $f$ which pass transversely through the wheel A.

The smaller chain wheel C is keyed on a shaft D and has outer rings $g$, $g'$ of synthetic rubber positioned and secured similarly as the rings $d$, $d'$, but the securing plates $e^2$, $e^3$, in this case are retained by a shoulder $h$ of the shaft D and the usual nut $h'$ which keeps the wheel C in place. This latter has also two rows of teeth $a^2$, $a^3$, spaced to correspond with the teeth of the larger wheel, but the space between them is formed as a deep groove in which is placed an additional ring $d^2$ of synthetic rubber.

A duplex chain J having links $j$ and rollers $j'$ passes round, and engages with, the teeth of both wheels, and the outer peripheries of all the synthetic rubber rings lie at a sufficient radial distance from the wheel centres to cause them to bear radially outward against the chain links and raise the rollers of the chain a slight distance from the bottoms of the spaces between the teeth and thus keep the chain taut and greatly lessen noise which would otherwise occur. The ring $d^2$ must, of course, be sprung into position.

Figure 3:
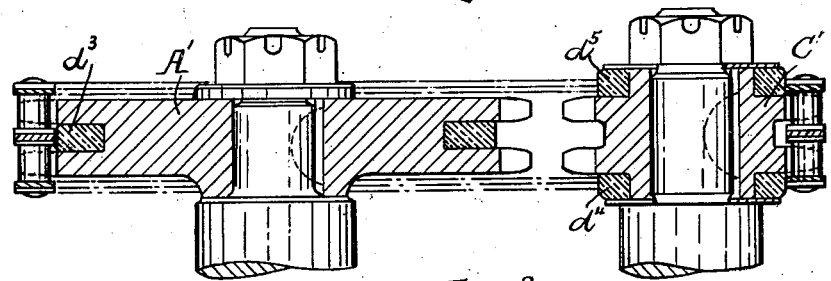
Figure 3 is a sectional view corresponding to Figure 2, but showing a different arrangement of the resilient rings.

In the modification shown in Figure 3, the larger wheel A' has only a single ring $d^3$ of synthetic rubber placed between the rows of teeth, while the smaller wheel C' has two rings $d^4$, $d^5$, at the outer sides of the teeth.

As will be understood either of the wheels may have one, two or three rings of synthetic rubber and, if desired, each of the wheels may have only a single row of teeth with a ring of synthetic rubber placed at one or each side of the teeth. Furthermore only one of the wheels may, if desired, be fitted with a ring or rings of rubber or like resilient material.

Having fully described my invention what I claim and desire to secure by Letters Patent is:

1. In combination, a pair of chain wheels rotatable about spaced axes, and a chain having links and rollers meshing with both wheels, at least one of the chain wheels having a circumferential ring of synthetic rubber secured thereto in such position that it will bear outwardly against the links of the chain without bearing against the rollers of the chain, the synthetic rubber ring acting automatically because of its inherent resilience to keep the chain in tension.

2. A chain wheel of roller chain wheel gear, teeth on said wheel, and a ring of resilient material placed around the periphery of said wheel on at least one side of said teeth and adapted to bear outwardly against the links of a meshing chain without bearing against the rollers of the chain and automatically keep the chain in tension.

3. A chain wheel of roller chain wheel gear, teeth on said wheel, rabbets formed at the two sides of said teeth, and a ring of resilient material placed in each rabbet and adapted to bear outwardly against the links of a meshing chain without bearing against the rollers of the chain and automatically keep said chain in tension.

4. A chain wheel of roller chain wheel gear, two rows of teeth on said wheel, a groove formed in the periphery of said wheel between said rows of teeth, and a ring of resilient material placed in said groove and adapted to bear outwardly against the links of a meshing chain without bearing against the rollers of the chain and automatically keep said chain in tension.

5. A chain wheel of roller chain wheel gear, a plurality of rows of teeth on said wheel, a groove formed in the periphery of said wheel between each two rows of teeth, and a ring of resilient material placed in each groove and adapted to bear outwardly against the links of a meshing chain without bearing against the rollers of the chain and automatically keep said chain in tension.

6. A chain wheel of roller chain wheel gear, teeth on said wheel, rabbets formed at the two sides of the wheel, and a ring of resilient material placed in each rabbet and adapted to bear outwardly against the links of a meshing chain without bearing against the rollers of the chain and automatically keep said chain in tension, and annular plates secured to the sides of said wheel to retain said resilient rings in said rabbets.

JULIUS CHARLES HAEFELI.

REFERENCES CITED

The following references are of record in the file of this patent:

UNITED STATES PATENTS

| Number | Name | Date |
| --- | --- | --- |
| 259,190 | Meatyard | June 6, 1882 |
| 527,153 | Murphy et al. | Oct. 9, 1894 |
| 1,870,801 | Engstrom | Aug. 9, 1932 |
| 1,877,339 | Kottlowski | Sept. 13, 1932 |
| 2,003,029 | Albersheim | May 28, 1935 |
| 2,319,282 | Woolf | May 18, 1943 |